United States Patent
May et al.

(10) Patent No.: US 10,101,356 B2
(45) Date of Patent: Oct. 16, 2018

(54) INSTRUMENT AND METHOD FOR MEASURING LOW INDICATED AIR SPEED

(71) Applicant: EIT, LLC, Sterling, VA (US)

(72) Inventors: Joe May, Sterling, VA (US); Matthew McConnell, Sterling, VA (US)

(73) Assignee: EIT LLC, Sterling, VA (US)

( * ) Notice: Subject to any disclaimer, the term of this patent is extended or adjusted under 35 U.S.C. 154(b) by 252 days.

(21) Appl. No.: 15/119,885

(22) PCT Filed: Feb. 18, 2015

(86) PCT No.: PCT/US2015/016329
§ 371 (c)(1),
(2) Date: Aug. 18, 2016

(87) PCT Pub. No.: WO2015/126910
PCT Pub. Date: Aug. 27, 2015

(65) Prior Publication Data
US 2017/0059604 A1     Mar. 2, 2017

Related U.S. Application Data

(60) Provisional application No. 61/941,541, filed on Feb. 19, 2014.

(51) Int. Cl.
*G01P 5/165* (2006.01)
*B64D 43/02* (2006.01)
*G01P 5/16* (2006.01)

(52) U.S. Cl.
CPC .............. *G01P 5/165* (2013.01); *B64D 43/02* (2013.01); *G01P 5/16* (2013.01)

(58) Field of Classification Search
CPC .............. G01P 5/16; G01P 5/165; B64D 3/02
See application file for complete search history.

(56) References Cited

U.S. PATENT DOCUMENTS

| | | | | |
|---|---|---|---|---|
| 2,482,701 A | * | 9/1949 | Anderson | G01P 5/16 73/861.68 |
| 2,799,164 A | * | 7/1957 | Ruskin | G01P 5/16 73/182 |
| 3,086,599 A | * | 4/1963 | Brown, Jr. | G01L 27/00 73/178 R |
| 3,104,547 A | * | 9/1963 | Suits | G01P 5/16 116/DIG. 43 |
| 3,380,298 A | * | 4/1968 | Hanson | G01P 5/165 137/237 |
| 3,400,584 A | * | 9/1968 | Beilman | G01P 5/16 73/178 R |
| 4,163,387 A | | 8/1979 | Schroeder | |
| 5,349,347 A | | 9/1994 | Muller | |

(Continued)

FOREIGN PATENT DOCUMENTS

| | | |
|---|---|---|
| CN | 201402160 Y | 2/2010 |
| EP | 0 188 909 A2 | 7/1986 |

*Primary Examiner* — David Bolduc
(74) *Attorney, Agent, or Firm* — W&C IP

(57) ABSTRACT

An improved instrument for measuring low indicated air speed greatly reduces variation with one or more of time, temperature, and ambient pressure change. This is accomplished by periodically re-zeroing the transducer using only a single electronically controlled valve. Re-zeroing may be initiated in response to a change in the internal temperature of the transducer.

10 Claims, 3 Drawing Sheets

(56) References Cited

U.S. PATENT DOCUMENTS

| | | | | |
|---|---|---|---|---|
| 5,946,642 | A * | 8/1999 | Hedrick | G01L 9/06 |
| | | | | 702/138 |
| 6,761,057 | B2 * | 7/2004 | Cronin | G01P 13/025 |
| | | | | 702/116 |
| 8,884,808 | B2 * | 11/2014 | Mandle | G01P 5/26 |
| | | | | 342/26 B |
| 2004/0193333 | A1 * | 9/2004 | Tschepen | G01P 5/00 |
| | | | | 701/7 |
| 2007/0145191 | A1 | 6/2007 | Smith et al. | |
| 2011/0238373 | A1 | 9/2011 | Foster et al. | |
| 2012/0118076 | A1 * | 5/2012 | Foster | G01P 5/16 |
| | | | | 73/861.65 |
| 2012/0180581 | A1 | 7/2012 | Foster | |
| 2014/0096618 | A1 * | 4/2014 | Ellison | G01P 3/62 |
| | | | | 73/861.65 |

\* cited by examiner

INSTRUMENT AND METHOD FOR MEASURING LOW INDICATED AIR SPEED

BACKGROUND OF THE INVENTION

Field of the Invention

The present invention generally relates to the measurement of air speed in aircraft and, more particularly, to an improved indicated air speed (IAS) measuring instrument capable of measuring very low air speeds.

Background Description

Measurement of air speed in aircraft is usually accomplished by placing a pitot-static tube (i.e., pitot tube) in the airstream for which the speed is to be measured. The ram effect of air entering the pitot tube creates a positive air pressure in the tube proportional to air speed. It is this ram air pressure which is measured to determine air speed.

For nearly one hundred years, general aviation aircraft have used a bellows actuated instrument to measure the difference in pressure between the pitot tube and a reference static tube to provide a measure of air speed. A bellows type air speed indicator is illustrated in FIG. 1. The pitot tube 10 is mounted on an exterior surface of the aircraft and pneumatically connected by way of conduit 11 to a diaphragm 12. A static port 13 is similarly pneumatically connected by way of conduit 14 to the diaphragm 12. The diaphragm 12 reacts to a differential pressure produced by the ram air from the pitot tube 10 and the static air from the static port 13 to produce a movement of the diaphragm 12 indicated by the double arrow 15. This movement is mechanically coupled to the gear 16 which drives the pointer 17 of an indicator dial 18 which is provided with indices indicating air speed in knots.

FIG. 2 shows a plot of ram pressure versus airspeed which shows the very low ram air pressures associated with low indicated air speeds. It will be observed that the plot is an exponential function. Because ram pressure is an exponential function, the pressure below about 20 knots is so low that the pneumatic-mechanical (bellows) system is unable to measure air speed accurately. This is due to stiction, friction, and mechanical advantage of the gear train, all in the air speed indicator instrument. Accordingly, most air speed indicators do not register below about 20 knots. For fixed wing aircraft, this shortcoming does not have a dramatic impact since the majority of a flight for a fixed wing aircraft flight is not at low air speeds. Rotary wing aircraft, however, are an entirely different matter. The failure of known air speed indicators to register below about 20 knots is especially disadvantageous for helicopters because at and below translational air speed, lift and helicopter performance begin to change dramatically.

In recent years, some pneumatic-mechanical measurement devices have been replaced by electronic transducers which convert ram air pressure to electronic values which can be converted to airspeed. FIG. 3 is a block diagram of an uncompensated electronic indicated air speed (IAS) instrument. As in the air speed indicator shown in FIG. 1, there is a pitot tube 30 and a static port 31. The pitot tube 30 is pneumatically connected by a conduit 32 to the positive input of an electronic pressure transducer 33, while the static port 31 is pneumatically connected by a conduit 34 to the negative input of pressure transducer 33. The pressure transducer 33 produces an output which is an electronic representation of the differential pressure input between the pitot tube 30 and the static port 31. If the output is an analog output, an analog-to-digital (A/D) converter (not shown) would be provided to convert the analog signal to a digital value. For the purposes of this illustration, it is assumed that the A/D function is incorporated into the pressure transducer 33. This digital value is input to a processor 35 which generates, either by computation or by table lookup, an output to a digital display 36.

While the electronic IAS instrument of FIG. 3 represents a distinct improvement over the instrument shown in FIG. 1, these devices have operational limits due to output drifts with, for example, time and transducer temperature. Curve 40 in FIG. 4 shows a time plot of uncompensated indicated air speed measurements at various temperatures. The temperature changes over time are shown by curve 41. Actual air speed in this case is about five knots. Curve 40 shows a typical drift of an uncompensated electronic IAS instrument measurement. Large changes in measured air speed occur for small changes in temperature at actual air speeds below 20 knots for uncompensated methods.

EP 0 188 909 A2 by Atkinson ("Atkison") discloses a system for compensating for sensor calibration drift for low airspeed applications. Atkinson teaches a pre-flight procedure whereby the same pressure is supplied to both a total pressure sensor and a static pressure sensor. If there is a difference in the readings between the two sensors, this constitutes a calibration error. The value of the error is saved into memory and subtracted from the differential readings during regular operation of the sensor during flight. Atkinson is limited by the fact that calibration error is only assessed pre-flight and treated as a static constant. In reality, calibration error of an IAS instrument fluctuates with changes in, for example, temperature, time (e.g., different times during the same flight), and altitude.

CN201402160Y discloses a pitot tube flowmeter with a zero point calibration function. During ordinary operation of the flowmeter, a total pressure tube and a static tube are both connected to a differential pressure sensor. A separate valve is provided for each tube to selectively close off the total pressure tube or the static tube from the sensor. To perform the zero calibration function, the two valves are closed and a third valve is opened which connects the two ports to the flowmeter to one another. The output of the transducer with the inputs cross connected is treated as a drift value and is recorded. Returning to regular operation, the recorded drift value is subtracted from the difference between the total pressure tube and static tube. This system is inefficient with the necessity for three separate valves. It further introduces an additional error source by measuring the error signal at a pressure which is not equal to local atmospheric pressure.

When there are rapid changes in temperature around an IAS instrument, such as, for example, during start-up, during descent from higher altitudes to lower altitudes or vice versa, when cabin heat settings are changed, or when the flight takes the aircraft from cloudy to clear conditions, the pressure transducer needs to be rezeroed much more often to maintain acceptable low speed measurement accuracy. This can be a problem because rezeroing requires a few seconds to perform and during that time, air speed measurement is unavailable.

SUMMARY

It is therefore an object of the present invention to provide an electronic indicated air speed (IAS) indicator/instrument that greatly reduces variation of reported air speed owing to variables such as time, temperature, and ambient pressure change (e.g., resulting from altitude changes).

It is another object of the present invention to re-zero as infrequently as possible while maintaining acceptable air speed accuracy.

According to the invention, there is provided a compensated IAS measurement instrument which accomplishes these and other objects and advantages by periodically re-zeroing the transducer as a function of time and/or temperature. The instrument addresses error sources which are not addressed by the prior art. In an exemplary embodiment, this extends the useful IAS lower limit from twenty knots down to about five knots.

In one aspect of the invention, the pressure transducer contains a temperature sensor (e.g., a semiconductor temperature device) the output of which is monitored by a processor such that when the temperature deviation produces a certain IAS measurement error (e.g., a one knot error) the processor initiates the re-zeroing process. This method keeps re-zeroing operations to the minimum number required to provide good accuracy yet minimum loss of data associated with re-zeroing. Furthermore, although the valve involved in re-zeroing wears out over extended usage, its operating life is greatly extended by minimizing the number of actuations as much as possible.

As compared to the system disclosed in CN201402160Y, the presently disclosed instrument and method have distinct advantages. First, a single three way directional solenoid valve is used as opposed to three, two-way solenoid valves, thereby reducing the cost of implementation. Furthermore, according to the present invention, the two inputs of the pressure transducer are connected to the ambient pressure which exists at the time of re-zeroing. In contrast, the system of CN201402160Y closes off both the total pressure tube and the static tube, trapping the static pressure and the ram pressure at the respective input ports of the transducer. When the third valve opens to equalize pressure at the two ports of the transducer, the pressure is the average of ram pressure and static pressure. This pressure is significantly different from the ambient pressure of the air surrounding the aircraft. This introduces an additional error source due to imperfect common pressure rejection of the transducer. The pressure transducer does not have perfect common pressure rejection, the effect being that any pressure difference from ambient produces a pressure measurement error due to imperfect common pressure rejection by the transducer. While this error may not be significant at comparative high speeds such as, for example, 100 knot airspeed, it can be significant at low airspeeds (e.g., 20 knots or less) because of the very low pressures associated with low airspeed. Furthermore, re-zeroing in CN201402160Y occurs based on ram pressure and static pressure which are present when the inline valves are closed. These pressures can frequently differ from the pressure which exists when the re-zeroing is completed. Both of these error sources can be significant at air speeds below about fifteen knots.

BRIEF DESCRIPTION OF THE DRAWINGS

The foregoing and other objects, aspects, and advantages will be better understood from the following detailed description of a preferred embodiment of the invention with reference to the drawings, in which.

DETAILED DESCRIPTION

Figure 5:
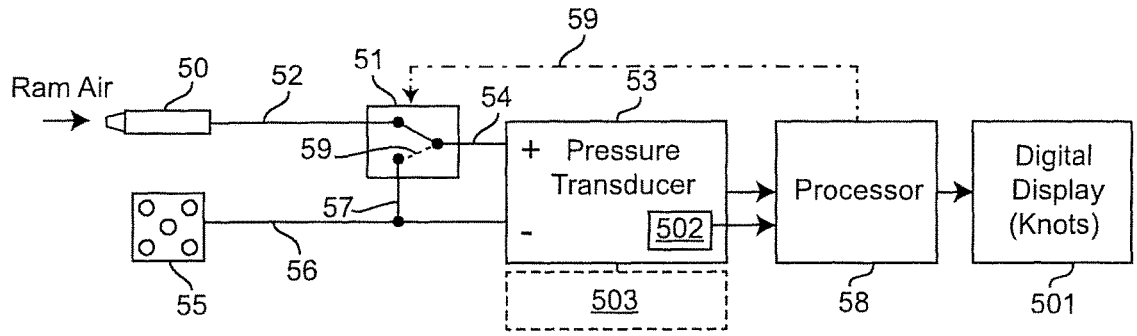
FIG. 5 is a block diagram of a compensated IAS measurement instrument according to the invention.

Referring again to the drawings, and more particularly to FIG. 5, there is shown the improved IAS measurement instrument according to an exemplary embodiment of the present invention. The pitot tube 50 is pneumatically coupled to a pneumatic valve 51 by a conduit 52. The output of valve 51 is pneumatically coupled to the positive input of pressure transducer 53 by a conduit 54. The static port 55 is coupled to the negative input of pressure transducer 53 by a conduit 56 and also to the pneumatic valve 51 by a conduit 57. A digital output of the pressure transducer 53 is connected to a processor 58 which, in turn, provides an output such as to a digital display 501. The pressure transducer 53 has a temperature output which is connected to the processor 58. In addition to the output to the digital display, the processor 58 generates a control signal on control line 59 to the pneumatic valve 51.

The pressure transducer 53 drifts with time, temperature, and to a lesser degree, with changes in ambient pressure. As the pressure transducer output drifts, the computed and displayed measure of IAS becomes increasingly inaccurate. To address this problem, the processor 58 calculates the temperature change of the pressure transducer 53 and/or the time elapsed since rezeroing was last performed. This allows rezeroing to occur only when it is actually needed, minimizing the number of instances and total amount of time that a pilot is without an indicated air speed measurement. The processor 58 determines when rezeroing is necessary because of time or temperature change considerations and sends a command signal over control line 59 to the pneumatic valve 51 which, in response to the command signal, disconnects the positive pneumatic input from the pitot tube 50 and reconnects the positive input pneumatically to the static port 55, as generally indicated by the dotted line 59. The reading at the output from the pressure transducer 53 when both inputs are connected to the static port 55 or connected together is recorded/stored in processor memory and subtracted from subsequent readings from the pressure transducer 53 when the positive port of the transducer 53 is once again connected to the pitot tube 50. This re-zeroing takes only seconds, and then the valve 51 is returned to its original position. This operation greatly reduces measurement error at low indicated air speed (IAS).

Figure 1:
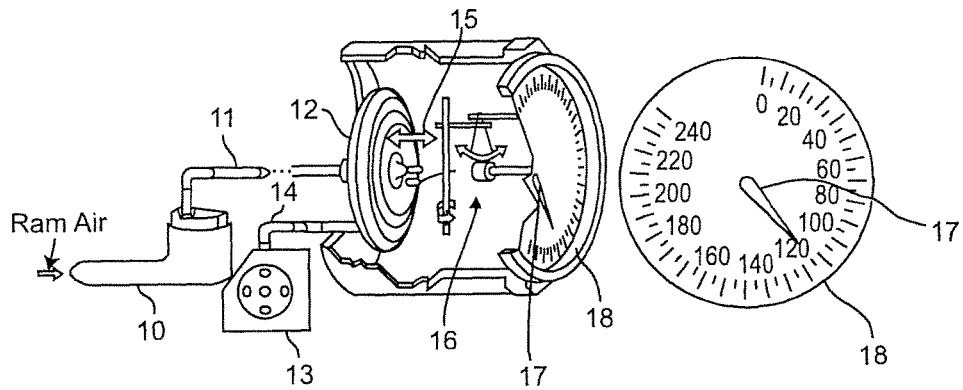
FIG. 1 is an illustration of a bellows type air speed indicator.
Figure 2:
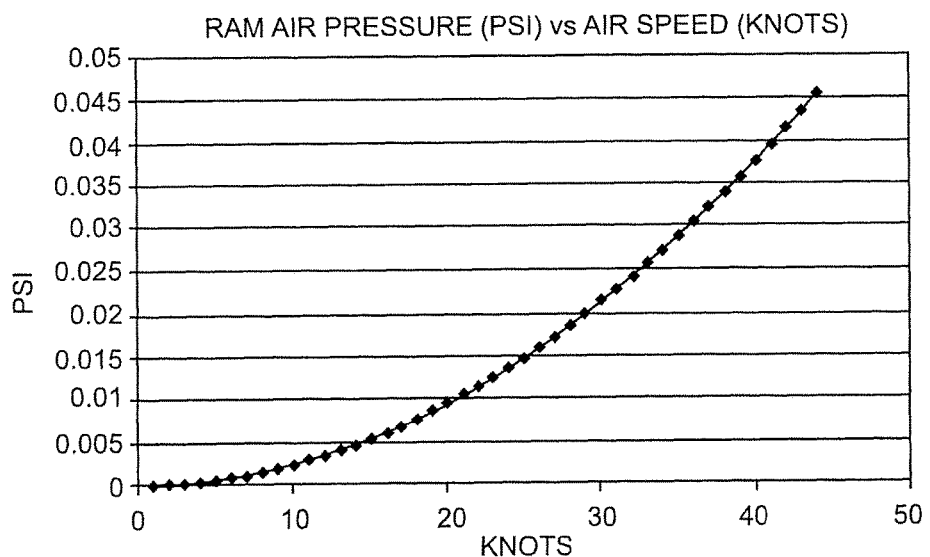
FIG. 2 is a plot of ram air pressure versus air speed.
Figure 3:
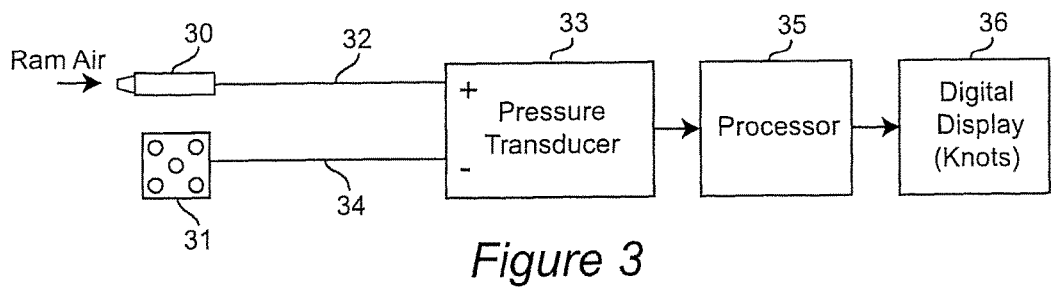
FIG. 3 is a block diagram of an uncompensated electronic IAS measurement instrument.
Figure 4:
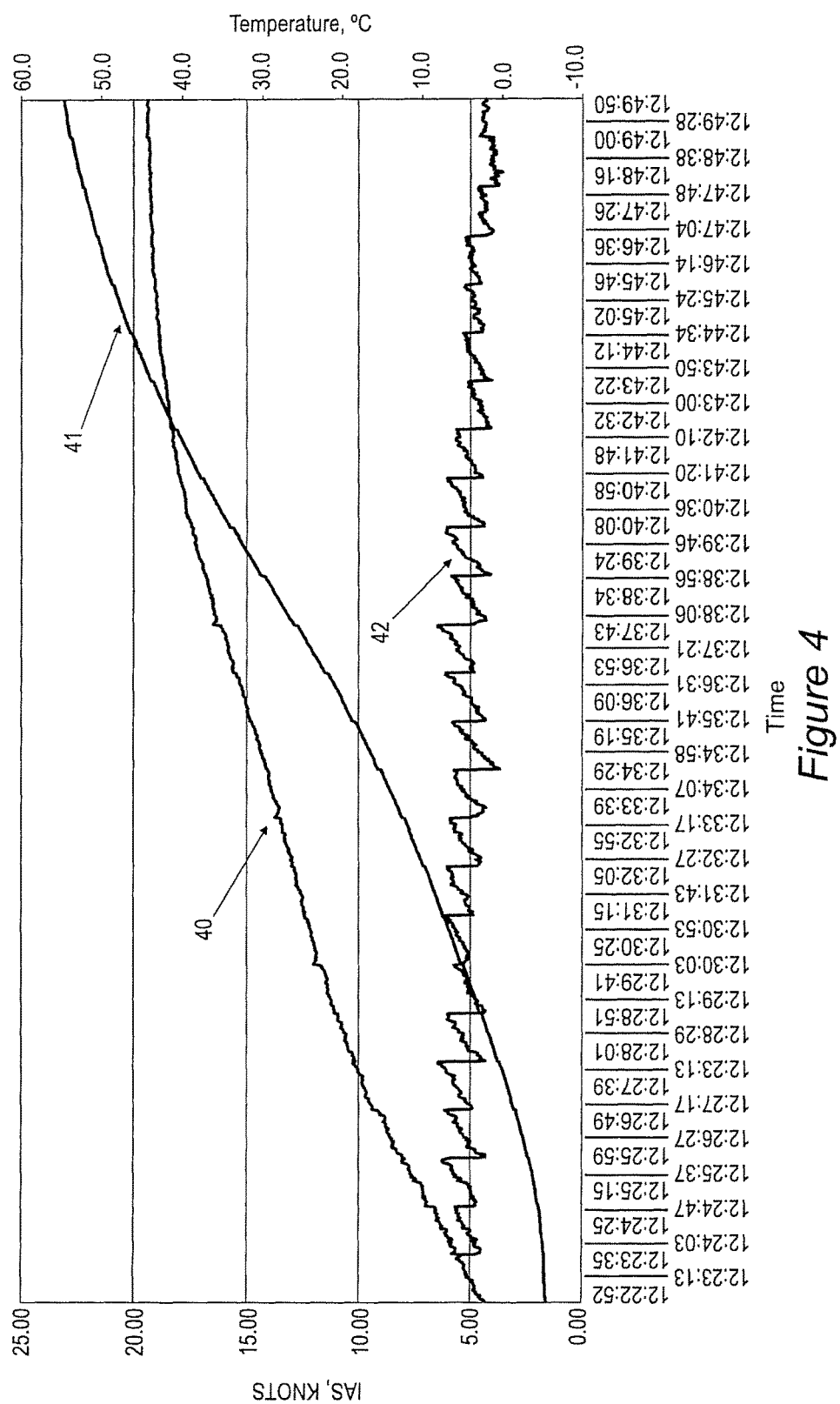
FIG. 4 is a plot of uncompensated IAS measurements versus time of an instrument of the type shown in FIG. 3 together with a plot of compensated IAS measurements versus time of an IAS instrument according to the invention.

FIG. 4 includes a curve 42 which plots measured IAS data of an exemplary embodiment of a compensated air speed instrument according to the invention. Notably, as the transducer temperature increases (see curve 41), the instrument re-zeros to prevent the measured IAS from deviating more than about 1 knot from the true/actual air speed, in this case 5 knots. The threshold for total change in temperature required to initiate a re-zeroing may be pre-selected and saved in the memory of processor 58. As previously discussed, FIG. 4 also includes a curve 40 which plots data collected from a typical pressure transducer using a method which is not temperature compensated. For the uncompensated instrument, curve 40 indicates that at an actual air speed of five knots, there is one knot change in measured air speed for about every one degree change in transducer temperature (curve 41). The curves illustrate a typical change in measured airspeed associated with corresponding change in temperature using compensated and uncompensated methods.

As demonstrated by the plots of FIG. 4, the instrument and method of the invention extends the IAS measurement range from a lowest value of approximately twenty knots to a compensated lowest value of about five knots. This is a dramatic improvement in measurement of a very important flight parameter. For rotary wing aircraft, the ability to measure IAS below twenty knots is very important because translational lift begins to be lost below about twenty-five knots. As the aircraft transitions into and out of translational lift, dramatic changes in flight characteristics occur. The wider range of IAS readings provided by the invention allows determination of entry into or exit out of translational lift. When combined with GPS determined ground speed, the low IAS measurement is also usable to obtain an accurate estimate of head wind/tail wind for the aircraft and calculation of descent angle.

Figure 6:
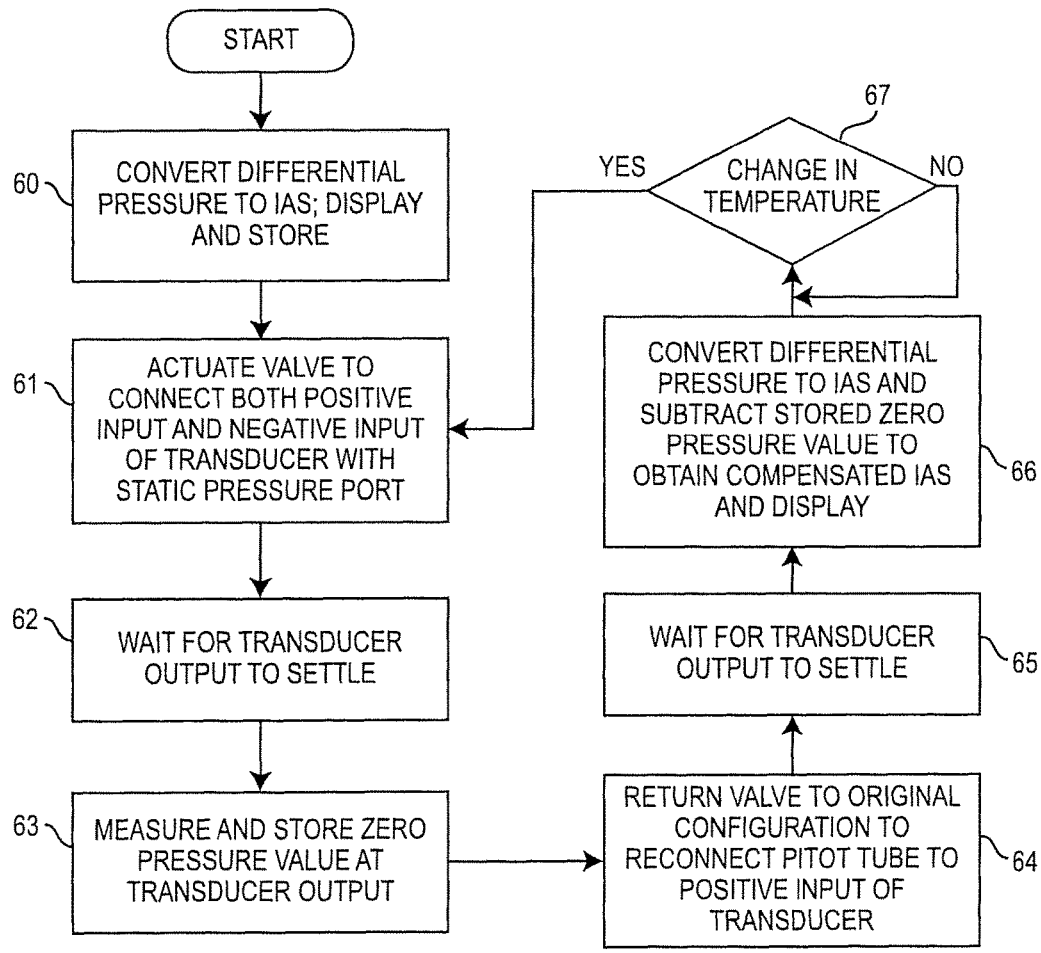
FIG. 6 is a flow diagram illustrating the operation of the invention.

FIG. 6 illustrates the logical operation of an exemplary embodiment of the invention as shown in FIG. 5. As illustrated, the process begins at function block 60 where the pitot tube 50 is connected to the positive input of the pressure transducer 53. At function block 70 the differential pressure is converted to an indicated air speed (IAS) which is displayed on digital display 501 and optionally stored (e.g., in a memory storage device (not shown) connected to processor 58). This is repeated for a predetermined period of time after which time the pneumatic valve 51 is actuated in response to a control signal from the processor 58 in function block 61 to connect the positive input of the pressure transducer 53 to the static port 55 and thereby also to the negative input of the pressure transducer 53. This is followed in function block 62 by a short period of time (e.g., 1-2 seconds) to allow the output of the pressure transducer 53 to settle. Then, in function block 63, a measurement is made and stored by processor 58 of the zero pressure value at the pressure transducer output (i.e., output of the pressure transducer 53 when there is no differential pressure between the positive and negative input ports). At function block 64, the pneumatic valve 51 is deactivated by a control signal from the processor 58 to re-connect the pitot tube 50 to the positive input of the pressure transducer 53. Again, as in function block 62, there is followed in function block 65 a short period of time (e.g., 1-2 seconds) to allow the output of the pressure transducer to settle. Finally, as indicated by function block 66, the differential pressure measured by pressure transducer 53 is passed to processor 58 where it is converted to an IAS, and the stored zero pressure value from function block 63 is subtracted from the converted IAS by the processor 58 to produce a compensated IAS measurement. This is then displayed to the pilot on a digital display 501. The process is then periodically repeated, as indicated by the process arrows returning to function block 61 to form a continuous loop. One loop constitutes a single re-zeroing process. In a preferred embodiment, re-zeroing occurs whenever there is at least a two degree change in transducer temperature, which in some scenarios is sufficient to generate a one knot error when the actual air speed is five or six knots. Alternatively or in addition, re-zeroing may be performed whenever a predetermined interval of time has elapsed to produce, for example, a one knot drift due to time alone. This can be determined empirically for a given system and then saved into the memory of the processor 58. In a sample case, this was about three minutes. Re-zeroing may occur at shorter intervals, especially if significant changes in temperature or altitude are occurring (e.g., the aircraft is ascending or descending) or during the warm up period at the beginning of the flight.

As an addition to monitoring the temperature with temperature sensor 502, a further improvement in performance may also be obtained by heating the pressure transducer 53 to a constant temperature above the highest ambient temperature. This greatly reduces or even prevents variations in pressure transducer output due to temperature. This is accomplished by using an external temperature regulating device 503 (e.g., a heating device) attached to or inside the pressure transducer 53 in conjunction with the temperature sensor 502 in the pressure transducer to regulate when the heater is turned on and off.

While the invention has been described in terms of exemplary embodiments and features, those skilled in the art will recognize that the invention can be practiced with modification within the spirit and scope of the appended claims.

Having thus described our invention, what we claim as new and desire to secure by Letters Patent is as follows:

1. A compensated indicated air speed instrument, comprising:
  a pitot tube into which ram air is induced to generate a positive air pressure proportional to air speed;
  a static port providing a reference air pressure;
  an electronic pressure transducer having a positive input port and a negative input port, the static port being connected directly to the negative input port of the electronic pressure transducer; and the pressure transducer has an output terminal which provides an electronic signal proportional to transducer internal temperature;
  only a single electronically controlled valve switchable between the pitot tube and the static port and providing an output to the positive input port of the electronic pressure transducer, the electronically controlled valve normally passing the output of the pitot tube to the positive input port of the electronic pressure transducer;
  a processor receiving an output of the electronic pressure transducer and computing an indicated air speed based on a differential air pressure output from the electronic pressure transducer, the processor periodically re-zeroing the electronic pressure transducer by controlling the electronically controlled valve to connect the positive input port of the electronic pressure transducer to the static port; and
  a display connected to the processor to display the computed indicated air speed.

2. The compensated indicated air speed instrument of claim 1, wherein said single electronically controlled valve is a pneumatically actuated valve.

3. The compensated indicated air speed instrument of claim 1, further comprising a temperature sensor that detects an internal temperature of the electronic pressure transducer, wherein the processor is configured to receive an output of the temperature sensor and initiate re-zeroing in response to a change in the internal temperature of the electronic pressure transducer.

4. The compensated indicated air speed instrument of claim 1, wherein the re-zeroing is performed at true ambient pressure to reduce common pressure error.

5. The compensated indicated air speed instrument of claim 1, further comprising a temperature regulating device that maintains the electronic pressure transducer at a constant temperature.

6. A method of determining a compensated indicated air speed using an electronic pressure transducer having a negative input port connected to a static port and a positive input port ordinarily connected to a pitot tube into which ram air is received for generating a positive air pressure proportional to air speed, comprising steps of:
- switching a connection of the positive input port of the electronic pressure transducer from the pitot tube to the static port using only a single electronically controlled valve;
- storing an output reading of the electronic pressure transducer in memory while the positive input port of the electronic pressure transducer is connected to the static port;
- returning the connection of the positive input port of the electronic pressure transducer from the static port to the pitot tube using only the single electronically controlled valve;
- subtracting from subsequent output readings of the electronic pressure transducer the stored output reading prior to computation and display of an indicated air speed; and
- repeating the steps of switching, storing, returning, and subtracting at one or more of different temperatures, different altitudes, and different times during a flight.

7. The method of claim 6, wherein said single electronically controlled valve is a pneumatically actuated valve.

8. The method of claim 6, further comprising a step of detecting an internal temperature of the electronic pressure transducer with a temperature sensor, wherein the step of repeating is performed in response to a change in the internal temperature of the electronic pressure transducer.

9. The method of claim 6, wherein the step of storing is performed at true ambient pressure to reduce common pressure error.

10. The method of claim 6, further comprising a step of maintaining the electronic pressure transducer at a constant temperature with a temperature regulating device.

* * * * *